United States Patent

Li

[11] Patent Number: 5,986,972
[45] Date of Patent: Nov. 16, 1999

[54] BEAM PATTERN SHAPING FOR TRANSMITTER ARRAY

[75] Inventor: Peter C. Li, Newport, R.I.

[73] Assignee: The United States of America as represented by the Secretary of the Navy, Washington, D.C.

[21] Appl. No.: 09/054,313

[22] Filed: Mar. 31, 1998

[51] Int. Cl.⁶ .................................................. H04B 17/00
[52] U.S. Cl. ............................................. 367/13; 367/138
[58] Field of Search ..................... 367/13, 138; 342/173, 342/174

[56] References Cited

U.S. PATENT DOCUMENTS

| | | | |
|---|---|---|---|
| 4,893,284 | 1/1990 | Magrane | 367/13 |
| 5,517,463 | 5/1996 | Hornbostel et al. | 367/13 |

*Primary Examiner*—Daniel T. Pihulic
*Attorney, Agent, or Firm*—Michael J. McGowan; Prithvi C. Lall; William F. Eipert

[57] ABSTRACT

A method to shape a transmit beam pattern of a transmitter array. A baseline time delay/phase coefficient is set for each transmitter. A plurality of beam pattern intensities are iteratively generated using the set of baseline time delays/phase coefficients and a plurality of sets of adjusted time delays/phase coefficients. Each beam pattern intensity has a unique set of time delays/phase coefficients associated therewith. Each one of the sets of adjusted time delays/phase coefficients differs from the set of baseline time delays/phase coefficients by only one time delay/phase coefficient. Each beam pattern intensity is compared with the optimal beam pattern intensity to determine which one of the set of unique time delays/phase coefficients minimizes a difference between the optimal beam pattern intensity and a corresponding one of the plurality of beam pattern intensities. The set of baseline time delays/phase coefficients is then replaced with the one of the set of unique time delays/phase coefficients that minimizes the difference. The above steps of iterative generation, comparing and replacing are repeated until the difference can no longer be reduced.

17 Claims, 1 Drawing Sheet

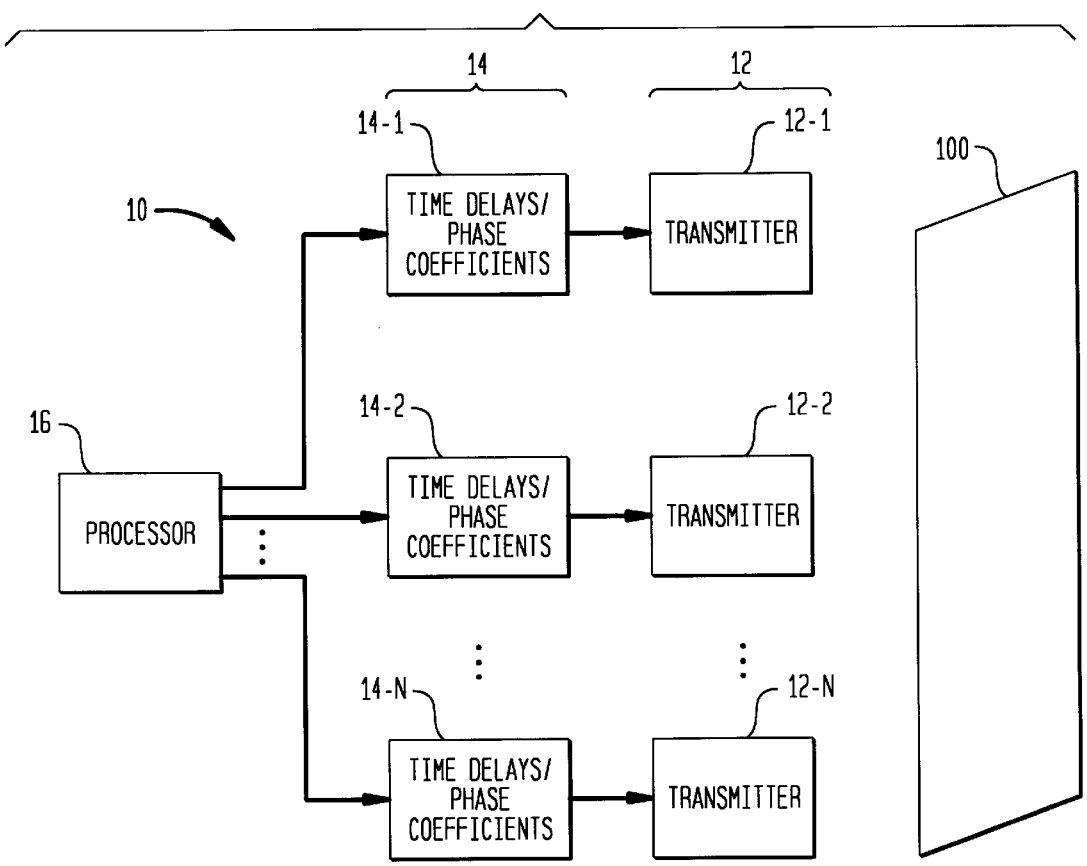

5,986,972

BEAM PATTERN SHAPING FOR TRANSMITTER ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to controlling transmitters such as sonar transmitters, and more particularly to a method and system for controlling the output of an array of transmitters in order to achieve a desired beam pattern.

(2) Description of the Prior Art

In sonar applications using an array of transmitters, it is desirable for each transmitter to be transmitting the same power at any given time in order to produce a beam pattern that maximizes the transmitted energy for a given power constraint. To provide a background to beamforming, the following briefly describes a typical situation that requires beamforming and a number of approaches that can be used.

Consider a plurality of transducers where each transducer transmits a signal that can be adjusted in amplitude and delayed in time. Together, the transmitted signals add constructively in certain directions and destructively in other directions. This variation in the gain profile provides a beam pattern. A typical beam pattern has a main lobe in the main axis and a number of side lobes in the off-axis directions. It is desirable in some applications to change the width of the main lobe and/or reduce the level of the side lobes. These types of adjustments are known as beam shaping.

One approach to beam shaping is to change the spacing between the transmitters. However, this approach involves a mechanical change to achieve a new beam pattern and is therefore not suitable for adaptive situations. Alternatively, one can electronically alter the beam pattern by changing the amplitude (i.e., amplitude shading) or the time delays (e.g., phase shading for a narrowband signal) associated with the transmitted signals.

In amplitude shading, the amplitudes of the transmitted signals are weighted to achieve a certain beam shape. For example, the amplitude can be tapered to achieve a wider main lobe and lower side lobe levels using well-known weighting functions such as the Binomial, Taylor or Dolph-Chebyshev weighting functions. However, this type of amplitude shading is generally only effective for a uniformly-spaced linear array of transmitters, and is therefore not appropriate for use with non-uniform or arbitrary array of transmitters. Also, extensions of these approaches to a two-dimensional array are not a direct process. Moreover, the tapering of the amplitudes usually causes a loss in the transmitted energy as attenuations are applied to the transmitters.

To maintain a high transmit level and to form beams at the same time, time-delay beamforming or phase shading for a narrowband signal can be used where the relative delays of the transmitted signals are used to form beams. This approach, however, lacks a direct analytic solution that relates the desired beam pattern to the time delays.

SUMMARY OF THE INVENTION

Accordingly, it is an object of the present invention to provide a method of shaping a beam pattern of an array of transmitters.

Another object of the present invention is to provide a method of generating transmitter phase coefficients to optimally shape the transmit beam pattern.

Other objects and advantages of the present invention will become more obvious hereinafter in the specification and drawings.

In accordance with the present invention, a method is provided to shape a transmit beam pattern of an array of transmitters based on an optimal beam pattern intensity. An initial time delay/phase coefficient is set for each transmitter such that a set of baseline time delays/phase coefficients is defined. A plurality of beam pattern intensities is iteratively generated using the set of baseline time delays/phase coefficients and a plurality of sets of adjusted time delays/phase coefficients. Each one of the sets of adjusted time delays/ phase coefficients differs from the set of baseline time delays/phase coefficients by only one time delay/phase coefficient. Thus, each beam pattern intensity has a unique set of time delays/phase coefficients associated therewith. Each beam pattern intensity is compared with an optimal beam pattern intensity to determine which set of unique time delays/phase coefficients minimizes a difference between the optimal beam pattern intensity and the corresponding one of the plurality of beam pattern intensities. The set of unique time delays/phase coefficients that minimizes the difference replaces the set of baseline time delays/phase coefficients to become the new set of baseline time delays/phase. The above steps of iterative generation, comparing and replacing are repeated until the difference can no longer be reduced with the existing set of baseline coefficients used to control the transmitters.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

The sole FIGURE is a schematic of a transmitter system used to carry out the method of the present invention.

DESCRIPTION OF THE PREFERRED EMBODIMENT(S)

Referring now to the sole FIGURE, a schematic view of a transmitter system used to carry out the method of the present invention is shown and referenced generally by numeral 10. System 10 includes an array 12 of transmitters 12-1, 12-2, 12-N, the outputs of which are controlled in terms of when transmission begins. Such control is provided by a corresponding array 14 of time delays/phase coefficients 14-1, 14-2, ..., 14-N coupled to transmitters 12-1, 12-2, ..., 12-N, respectively. For purpose of illustration, it will be assumed that each transmitter in array 12 is a narrow-band sonar transmitter that generates a simple sine wave. As such, relative phase changes between each of transmitters 12-1, 12-2, ..., 12-N, is indicative of a time delay therebetween. However, it is to be understood that each transmitter in array 12 could also be capable of wide-band transmission in which case time delays between transmissions is the relevant quantity to control. Control of time delays/phase coefficients 14-1, 14-2, ..., 14-N is dictated by processor 16 which operates in accordance with the present invention to shape the beam pattern generated by array 12.

The method of the present invention will be described as it relates to the setting of phase coefficients 14-1, 14-2, ...

, 14-N for narrow-band transmitters 12-1, 12-2, ..., 12-N, respectively. The present invention searches for a suitable set of phase coefficients using a novel search methodology in order to shape the transmission beam pattern at some far field 100. Far field 100 is representative of a plane or any other spatial shape that can be divided into discrete points and be indexed by a set of coordinates. For example, if far field 100 is a two-dimensional plane at which measurements are to be taken, far field 100 can be indexed by a pair of numbers (x,y) which could correspond to azimuth and elevation, respectively. At each coordinate (x,y) of far field 100, the desired beam intensity is provided so that a desired beam pattern intensity B(x,y) is given for all of far field 100.

Let b(x,y) designate the beam pattern intensity that is generated at far field 100 by the transmitters 12-1, 12-2, 12-N. The goal of the present invention is to control time delays/phase coefficients 14-1, 14-2, ..., 14-N so that the generated intensities b(x,y) equal or closely approximate the desired intensity B(x,y). To measure how close the generated beam intensity b(x,y) is to the desired beam intensity B(x,y), a beam error quantity or BE is defined as $$BE = \sum_x \sum_y |B(x, y) - b(x, y)|^2 \quad (1)$$

Thus, beam error BE is a non-negative quantity that approaches zero as the generated intensities b(x,y) approach the desired intensity B(x,y).

The present invention reduces beam error BE by adjusting time delays/phase coefficients 14-1, 14-2, ..., 14-N. In terms of the illustrative example (i.e., narrow-band transmitters 12-1, 12-2, ..., 12-N), the remainder of the description will refer only to phase coefficients. While there are many ways to adjust phase coefficients 14-1, 14-2, ..., 14-N, the present invention does so in a way that is adaptive and in a way that minimizes degradation in the beam pattern during such adjustment of the phase coefficients. More specifically, the present invention adjusts phase coefficients 14,-1, 14-2, 14-N, only one at a time in an iterative fashion. Each adjustment changes one phase coefficient by a change value $\rho$.

The process starts by setting all phase coefficients 14-1, 14-2, ..., 14-N to a known value to thereby define an initial baseline set of phase coefficients. One of the transmitters is designated as the reference transmitter having a fixed phase coefficient. Thus, there are N-1 degrees of freedom to adjust the phase coefficients. The remaining phase coefficients are considered relative to the reference transmitter. That is, only the difference in the phase coefficients need be considered. In general, the initial setting of the baseline set of phase coefficients can be arbitrary. Since the beam pattern without shading tends to be used as a reference beam, one can start with an initial set of baseline phase coefficients in which, for example, all phase coefficients are set to the same value, e.g., zero. The beam error BE is then calculated at processor 16 and saved.

Adjustments in the baseline set of phase coefficients are performed iteratively by increasing and then decreasing each phase coefficient 14-1, 14-2, ..., 14-N by change value $\rho$. Each resulting intensity b(x,y) generated by this change is then used to again calculate beam error BE. Thus, for N coefficients, there are 2(N-1) actual beam intensities b(x,y) and 2(N-1) beam errors BE for any given set of baseline phase coefficients. Once this is done, the set of phase coefficients producing the smallest beam error BE is selected to be the new set of baseline phase coefficients. The above process is then repeated. That is, 2(N-1) adjustments are made to the new set of baseline phase coefficients in order to generate 2(N-1) actual beam intensities b(x,y) and 2(N-1) beam errors BE. Once again, the set of phase coefficients producing the smallest beam error BE becomes the new set of baseline coefficients on which the next set of adjustments will be performed. The process continues until the current set of baseline coefficients produces the smallest beam error BE or until the difference in beam error BE does not change significantly.

The change value $\rho$ can be selected or adjusted to suit a particular application. A large value of $\rho$ allows the process of the present invention to move quickly to completion while a smaller value of $\rho$ allows the actual beam pattern intensities b(x,y) to more closely approximate the desired beam pattern intensities B(x,y). However, the trade-off for a smaller value of $\rho$ is that a greater number of iterations are required to reach the ultimate solution.

The process of the present invention can be carried out empirically by making iterative measurements at far field 100. Alternatively, the process can be carried out analytically by making an assumption that the beam pattern is a summation of the individual transmitter response adjusted by the appropriate phase coefficients. For example, one can first take empirical measurements of the individual transmitter response and store this information in a database. This information can be used to determine an approximation to the actual beam intensity b(x,y) by taking a summation of the individual transmitter response with an adjustment applied according to the corresponding phase coefficient. However, this is not as accurate as taking empirical measurements of the full beam pattern.

The advantages of the present invention are numerous. The process can be applied to any sonar or other transmitter array geometry. The adaptive approach can be adjusted to achieve a quick solution or a finely-tuned solution by merely adjusting the change value $\rho$. The approach can be extended to more complex transmissions in which case the time delays between commencement of transmission is adjusted adaptively (as opposed to phase coefficient adjustment in the case of narrow-band transmissions). The process achieves an optimal set of time delays/phase coefficients relative to a desired beam pattern. The beam error near its minimum is smooth and locally convex (i.e., nearest neighbor time delays/phase coefficients are checked) which tends to make the ultimate solution robust. In this way, small time delay/phase perturbations will not lead to a large degradation in the actual beam pattern.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of shaping a transmit beam pattern for an array of narrow-band transmitters, comprising the steps of:

selecting a measurement plane;

providing a desired beam pattern intensity at said measurement plane;

setting a phase coefficient for each of said transmitters, wherein a set of phase coefficients is defined;

selecting a phase coefficient change value;

generating a beam pattern intensity at said measurement plane using said set of phase coefficients;

forming a difference between said desired beam pattern intensity and said generated beam pattern intensity;

adjusting one said phase coefficient by an amount equal to said phase coefficient change value to revise said set of phase coefficients; and repeating said steps of generating a beam pattern intensity, forming a difference and adjusting one said phase coefficient until said difference is minimized, wherein said set of phase coefficients for which said difference is minimized is used to control said transmitters.

2. A method according to claim 1 wherein said step of setting comprises the step of setting each said phase coefficient to be the same.

3. A method according to claim 1 wherein said step of setting comprises the step of setting each said phase coefficient to zero.

4. A method according to claim 1 wherein said step of providing comprises the steps of:

dividing said measurement plane into an indexed grid of discrete points; and providing said desired beam pattern at each of said discrete points.

5. A method according to claim 4 wherein said step of generating is carried out at each of said discrete points.

6. A method according to claim 5 wherein said step of forming comprises the steps of:

forming, at each of said discrete points, a discrete point difference between said desired beam pattern intensity and said generated beam pattern intensity;

squaring each said discrete point difference; and summing each said squared discrete point difference.

7. A method according to claim 1 wherein said step of generating comprises the steps of:

operating said transmitters using said set of phase coefficients; and measuring, at said measurement plane, said beam pattern intensity resulting from said step of operating.

8. A method according to claim 1 further comprising the step of changing said phase coefficient change value wherein the time required to minimize said difference is reduced when said phase coefficient change value is increased, and wherein the value of said difference so-minimized is reduced when said phase coefficient change value is reduced.

9. A method of shaping transmit beam pattern intensity for an array of transmitters, comprising the steps of:

selecting a measurement field;

providing a desired beam pattern intensity at said measurement field;

setting a time delay for each of said transmitters wherein a set of time delays is defined;

selecting a time delay change value;

generating a beam pattern intensity at said measurement field using said set of time delays to control the time at which each of said transmitters begins to transmit;

forming a difference between said desired beam pattern intensity and said generated beam pattern intensity;

adjusting one said time delay by an amount equal to said time delay change value to revise said set of time delays;

repeating said steps generating a beam pattern intensity, forming a difference and adjusting one said time delay until said difference is minimized; and operating said transmitters in accordance with said set of time delays for which said difference is minimized.

10. A method according to claim 9 wherein said step of setting comprises the step of setting each said time delay to be the same.

11. A method according to claim 9 wherein said step of setting comprises the step of setting each said time delay to zero.

12. A method according to claim 9 wherein said step of providing comprises the steps of:

dividing said measurement field into an indexed array of discrete points; and providing said desired beam pattern at each of said discrete points.

13. A method according to claim 12 wherein said step of generating is carried out at each of said discrete points.

14. A method according to claim 13 wherein said step of forming comprises the steps of:

forming, at each of said discrete points, a discrete point difference between said desired beam pattern intensity and said generated beam pattern intensity;

squaring each said discrete point difference; and summing each said squared discrete point difference.

15. A method according to claim 9 further comprising the step of changing said time delay change value wherein the time required to minimize said difference is reduced when said time delay change value is increased, and wherein the value of said difference so-minimized is reduced when said time delay change value is reduced.

16. A method of shaping a transmit beam pattern for an array of narrow-band transmitters, comprising the steps of:

providing an optimal beam pattern intensity;

setting a baseline phase coefficient for each of said transmitters, wherein a set of baseline phase coefficients is defined;

iteratively generating a plurality of beam pattern intensities using said set of baseline phase coefficients and a plurality of sets of adjusted phase coefficients wherein each of said plurality of beam pattern intensities has a unique set of phase coefficients associated therewith, and wherein each one of said plurality of sets of adjusted phase coefficients differs from said set of baseline phase coefficients by only one phase coefficient;

comparing each of said plurality of beam pattern intensities with said optimal beam pattern intensity to determine one of said set of unique phase coefficients that minimizes a difference between said. optimal beam pattern intensity and a corresponding one of said plurality of beam pattern intensities;

replacing said set of baseline phase coefficients with said one of said set of unique phase coefficients that minimizes said difference; and repeating said steps of iteratively generating a plurality of beam pattern intensities, comparing each of said plurality of beam pattern intensities with said optimal beam pattern intensity and replacing said set of baseline phase coefficients until said difference can no longer be reduced, wherein said set of baseline coefficients so-replaced is used to control said transmitters.

17. A method according to claim 16 wherein said step of setting comprises the step of setting each said baseline phase coefficient to zero.

* * * * *